United States Patent
Cunningham et al.

(10) Patent No.: US 7,665,671 B2
(45) Date of Patent: Feb. 23, 2010

(54) THERMOSTATIC MIXING VALVE

(75) Inventors: Aaron Christian Cunningham, Kenmore (AU); Tony Mark Scott, Bunya (AU)

(73) Assignee: GSA Industries (Aust) Pty Ltd, Melbourne, Victoria (AU)

( * ) Notice: Subject to any disclaimer, the term of this patent is extended or adjusted under 35 U.S.C. 154(b) by 337 days.

(21) Appl. No.: 10/559,975

(22) PCT Filed: Jun. 4, 2004

(86) PCT No.: PCT/AU2004/000748

§ 371 (c)(1),
(2), (4) Date: Jul. 3, 2006

(87) PCT Pub. No.: WO2004/109421

PCT Pub. Date: Dec. 16, 2004

(65) Prior Publication Data

US 2007/0023535 A1 Feb. 1, 2007

(30) Foreign Application Priority Data

Jun. 6, 2003 (AU) .............................. 2003902843

(51) Int. Cl.
G05D 23/185 (2006.01)
G05D 23/13 (2006.01)
G05D 23/12 (2006.01)
G05D 23/08 (2006.01)
F23N 5/10 (2006.01)

(52) U.S. Cl. ................. 236/12.11; 236/12.1; 236/12.16; 236/100; 236/93 R; 236/93 A; 236/9 R

(58) Field of Classification Search ................. 236/12.1, 236/12.16, 12 R, 93 R, 93 A, 100, 99 J
See application file for complete search history.

(56) References Cited

U.S. PATENT DOCUMENTS

| 4,469,275 | A | * | 9/1984 | DeSalve ................... 236/93 A |
| 4,475,684 | A |   | 10/1984 | Garlick et al. |
| 5,203,496 | A | * | 4/1993 | Kline ........................ 236/12.2 |
| 6,021,952 | A | * | 2/2000 | Antoniello et al. ........ 236/12.16 |
| 6,079,625 | A | * | 6/2000 | Lebkuchner ............... 236/12.2 |

FOREIGN PATENT DOCUMENTS

CA 2409492 A1 4/2003

OTHER PUBLICATIONS

International Search Report dated Sep. 16, 2004, regarding PCT application No. PCT/AU2004/000748.

* cited by examiner

Primary Examiner—Thomas E Denion
Assistant Examiner—Michael Carton
(74) Attorney, Agent, or Firm—Graybeal Jackson LLP

(57) ABSTRACT

Thermostatic mixing valve has a valve body, a cold fluid inlet, a hot fluid inlet, and a fluid outlet. Mixing chamber is located between the respective fluid inlets and the fluid outlet. Thermostatic element is located in or adjacent to the mixing chamber and is arranged to contact a piston at one end and via a mixing tube the valve body at the other end. Piston regulates flow through the fluid inlets into the mixing chamber. The piston is can move due to continued expansion of the thermostatic element after the piston has closed off the second fluid inlet. Valve body has an internal thread with which a thread on mixing tube permits adjustment of the relative position of the thermostatic element within the valve body and hence the set temperature of the thermostatic mixing valve.

26 Claims, 3 Drawing Sheets

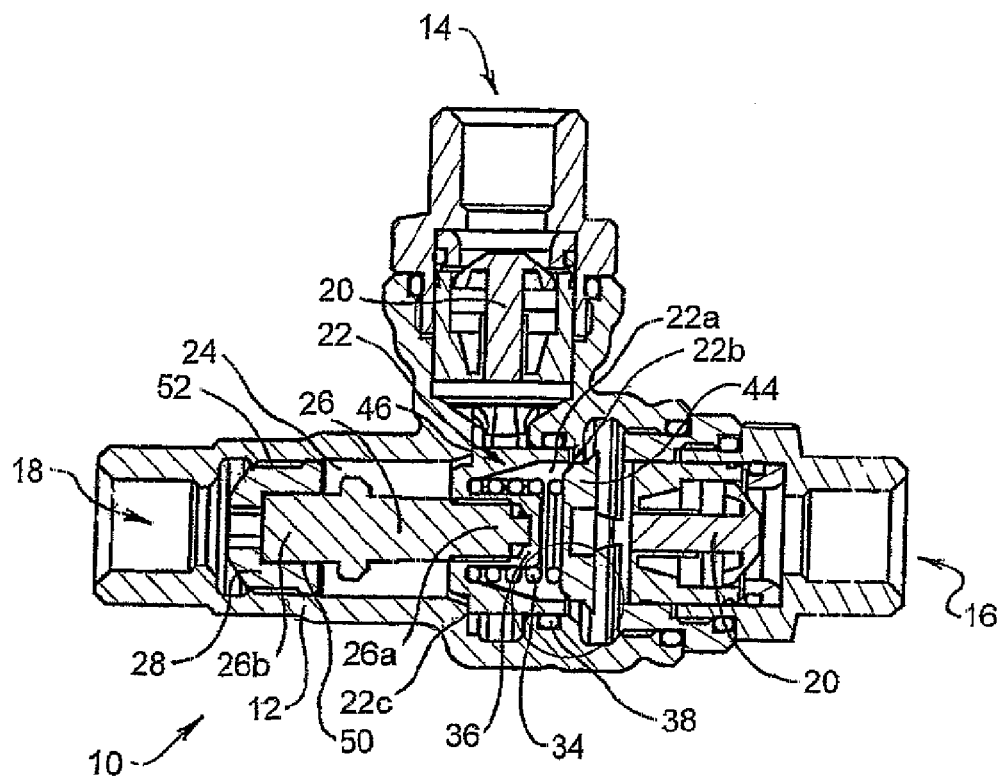
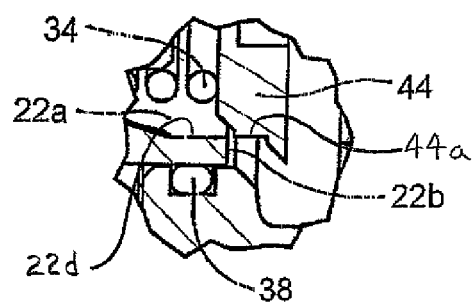
FIG 1

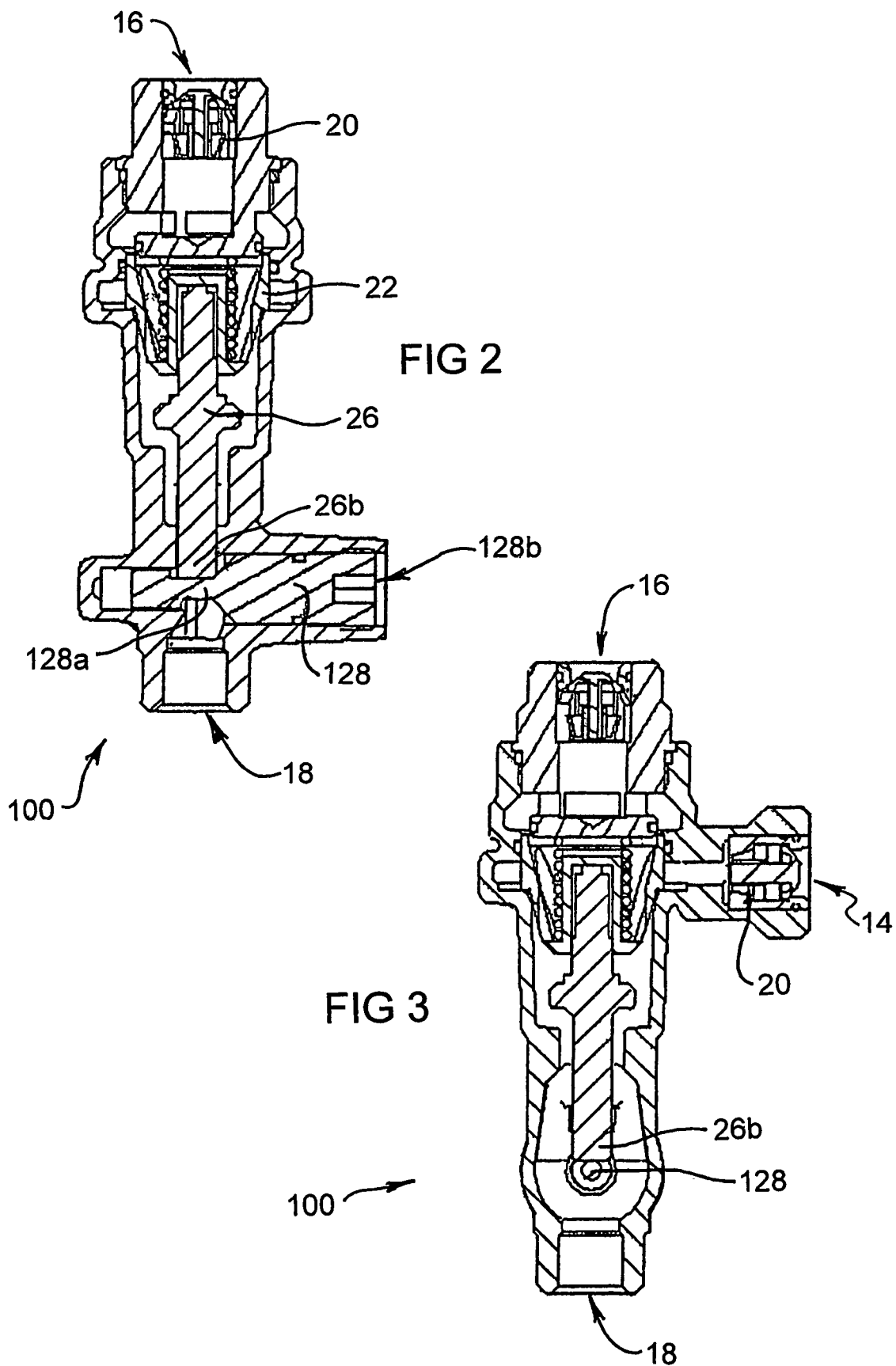

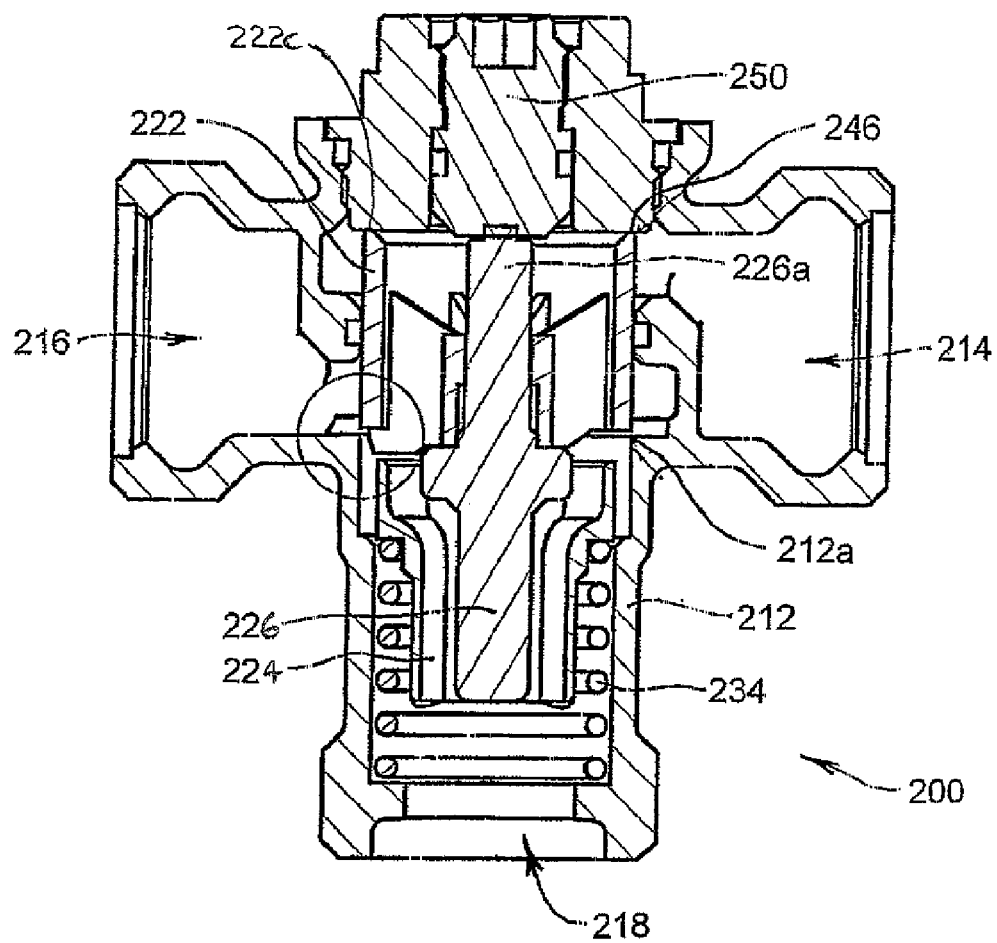
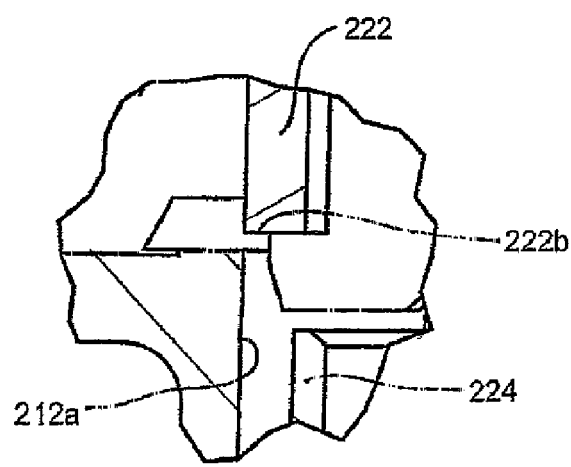
FIG 4

THERMOSTATIC MIXING VALVE

CROSS-REFERENCE TO RELATED APPLICATION

This is a continuation-in-part application that claims benefit, under 35 USC §120, of co-pending International Application PCT/AU2004/000748 filed on 4 Jun. 2004, designating the United States, which claims foreign priority benefits under 35 USC §119 (a) to Australian Patent Application No. 2003902843, filed 6 Jun. 2003, which applications are incorporated herein by reference.

FIELD OF THE INVENTION

The present invention relates to a thermostatic mixing valve.

BACKGROUND OF THE INVENTION

Thermostatic mixing valves enable hot and cold fluids, typically water, to be accurately mixed so as to deliver fluid at a desired temperature to the valve outlet. One form of thermostatic mixing valves adopts a "T" pattern in which the hot and cold water enters through inlets in the arms of the "T" and the mixed water exits through an outlet in the base of the "T". Another form of thermostatic mixing valve adopts an "L" pattern in which the hot and cold fluid inlets are orientated at right angles to each other.

Thermostatic mixing valves include hot and cold seats for respectively isolating the flow of hot and cold fluids through the valve. Such seats are typically provided by a hard edge of a piston pressing firmly against a flat face of the valve body to thereby prevent fluid flow. In one form of "T" pattern mixing valves, both the hot and cold seats have been provided in this manner. However, the design of such mixing valves has been complicated by the need to provide a mechanism for allowing for any continued expansion of the thermostatic element after the flow of hot and cold fluids is adjusted. This problem has been addressed by including a spring arrangement adjacent to the leading end of the thermostatic valve (i.e. in the hot seat). The inclusion of such an arrangement requires an extra opening to be formed in the valve body and also increases the part and production costs for the valve.

Another problem with such mixing valves is that to enable adjustment of the set temperature of the mixed water exiting the outlet (and thereby the rest position of the thermostatic element), additional constructional features or components have to be provided. This inevitably increases the cost of the mixing valve.

The present invention seeks to provide an improved thermostatic mixing valve that addresses at least some of the above mentioned problems.

SUMMARY OF THE INVENTION

According to a first aspect of the present invention there is provided a thermostatic mixing valve including a valve body having a first fluid inlet, a second fluid inlet and a fluid outlet, a mixing chamber located between the respective fluid inlets and the fluid outlet, a thermostatic element located in or adjacent to the mixing chamber, a piston arranged for movement within the valve body in response to the thermostatic element, said piston arranged to throttle the flow of the first fluid into the mixing chamber by varying its position relative to a first fluid seat, said piston also arranged to throttle the flow of the second fluid into the mixing chamber by varying its position relative to a second fluid seat and wherein the second fluid seat is configured to allow for movement of the piston as a result of continued expansion of the thermostatic element.

Preferably, the second fluid seat is formed as an elongate portion extending in the direction of the movement of the piston so as to allow the piston to slide along the elongate portion to thereby allow for continued expansion of the thermostatic element.

In accordance with one embodiment of the invention, the elongate portion is formed on the valve body and an outer peripheral wall of the piston slides along the elongate portion.

In accordance with another embodiment of the invention, the elongate portion is formed on a member located within the valve body and an inner peripheral wall of the piston slides along the elongate portion.

The first fluid seat is preferably formed in a portion of the valve body.

An adjustment mechanism may be provided to adjust the positioning of the thermostatic element relative to the piston so that a set temperature of the fluid through the fluid outlet can be varied.

Preferably, adjustment of the adjustment mechanism results in a change in the flow of fluid from the respective hot and cold fluid inlets into the mixing chamber so that the set temperature of the fluid flowing through the fluid outlet is adjusted.

In one preferred arrangement, a mixing tube is configured to seat a trailing end of the thermostatic element, while a leading end of the thermostatic element is arranged to contact a portion of the piston. The adjustment mechanism may include a thread arrangement formed on the periphery of the mixing tube which is arranged to engage with a thread formed in the sidewall of the mixing chamber. Such a thread arrangement enables the mixing tube's positioning within the mixing chamber to be adjusted relative to the piston by rotating the mixing tube.

Alternatively, the adjustment mechanism may enable the size of the mixing tube to be varied so that it can be located in one of a series of seats formed in the sidewall of the mixing chamber.

With either arrangement, adjustment of the adjustment mechanism preferably takes place during manufacture or installation of the thermostatic mixing valve via access through the fluid outlet.

According to a further aspect of the invention there is provided a thermostatic mixing valve including a valve body having a first fluid inlet, a second fluid inlet and a fluid outlet, a mixing chamber located between the respective fluid inlets and the fluid outlet, a piston arranged to regulate the flow of the first and second fluids from their respective inlets into the mixing chamber, a thermostatic element located in or adjacent to the mixing chamber and an adjustment mechanism for adjusting a rest position of the thermostatic element.

Preferably, the adjustment mechanism includes an adjustment pin. The adjustment pin is threadedly connected to the valve body of the thermostatic mixing valve. The adjustment pin is configured so that an inner portion of the pin is in contact with the trailing end of the thermostatic element and an outer end of the pin is accessible from the outside of the valve body thereby enabling movement of the pin. The pin is configured so that movement thereof, for example rotation, results in an adjustment in the positioning of the thermostatic element relative to the piston.

In a preferred forms of either aspects of the invention, a check valve is mounted adjacent each of the hot and cold fluid inlets to prevent back flow of fluid through the respective inlets.

Preferably, the first fluid inlet is a cold fluid inlet and the second fluid inlet is a hot fluid inlet.

The present invention also provides a method of adjusting the temperature of an outlet fluid through a thermostatic valve, said thermostatic valve including a valve body having a first fluid inlet, a second fluid inlet and a fluid outlet, a mixing chamber located between the respective fluid inlets and the fluid outlet, a piston arranged to regulate the flow of the first and second fluids from their respective inlets into the mixing chamber, a thermostatic element located in or adjacent to the mixing chamber and an adjustment mechanism for adjusting the rest positioning of the thermostatic element relative to the piston, said method including the step of adjusting the adjustment mechanism so as to adjust the rest position of the thermostatic element relative to the piston to thereby change the flow of the first and second fluids into the mixing chamber until the temperature of the outlet fluid through the fluid outlet is at a desired set temperature.

BRIEF DESCRIPTION OF THE DRAWINGS

Embodiments of the invention will now be described, by way of example only, with reference to the accompanying drawings in which:—

FIG. 1 is a cross sectional view of a thermostatic mixing valve in accordance with a first embodiment of the invention;

FIG. 2 is a cross sectional view of a thermostatic mixing valve in accordance with a second embodiment of the invention;

FIG. 3 is a cross sectional view of the thermostatic mixing valve shown in FIG. 2 at 90° rotation; and FIG. 4 is a cross section view of a thermostatic mixing valve in accordance with a third embodiment of the invention.

DETAILED DESCRIPTION OF THE PREFERRED EMBODIMENTS

FIG. 1 illustrates a thermostatic mixing valve 10 in accordance with an embodiment of the invention. The valve 10 includes a valve body 12, a cold fluid inlet 14, a hot fluid inlet 16 and a mixed fluid outlet 18. As is evident from FIG. 1, the cold fluid inlet 14 and the hot fluid inlet 16 are orientated in an "L" shape so that the cold and hot fluid inlets 14, 16 are orientated at right angles to each other.

Located within the valve body 12 adjacent to each of the cold and hot fluid inlets 14, 16 is a respective check valve 20. Each check valve 20 is arranged to prevent inadvertent backflow of fluid through the respective cold and hot inlets 14, 16. It will be appreciated that although it is desirable to include such a check valve 20 adjacent each of the cold and hot inlets 14, 16 it is not essential to a proper working of the thermostatic mixing valve 10.

Located between the respective cold and hot fluid inlets 14, 16 is a regulating piston 22. The piston 22 is located within the valve body 12 and is configured so that it can regulate, that is throttle, the flow of cold and hot fluid from their respective cold and hot fluid inlets 14, 16 into a mixing chamber 24. A thermostatic element 26 is located in the mixing chamber 24 between a mixing tube 28 and the piston 22. The mixing tube 28 is arranged to direct the flow of hot and cold fluid onto the thermostatic element 26. An adjustment mechanism, which will be described in more detail below, is formed as part of the mixing tube 28 and is arranged so that upon adjustment thereof, the mixing tube 28 moves in a direction towards or away from the hot fluid inlet 16, thereby adjusting the rest position of the thermostatic element 26. A change in the rest position of the thermostatic element 26, results in a change in the positioning of the piston 22. This in turn results in a change in the set flow of fluid from the respective cold and hot fluid inlets 14, 16 into the mixing chamber 24. This change in hot and cold fluid flow, results in the set temperature of the fluid flowing through the fluid outlet 18 being adjusted. The manner by which the flow of fluids from the respective cold and hot inlets 14, 16 to the mixing chamber 24 is varied by the piston 22 will be described in more detail below.

The piston 22 includes a bore 22a for housing a spring 34. The spring 34 is located about the periphery of a socket 36 which is formed in the piston 22 so as to receive a leading end 26a of the thermostatic element 26. The piston 22 has a first end 22b which is adjacent the hot inlet 16 and a second end 22c which is adjacent the cold inlet 14.

A seal 38, in the form of at least one O-ring, is located in a groove formed in the valve body 12 to provide a seal between the outer peripheral wall of the piston 22 and the valve body 12. The use of other forms of seal is envisaged.

Mounted in the valve body 12 is a valve member 44. The first end 22b of the piston 22 and the periphery of the member 44 define a flow path through which hot fluid can pass through the bore 22a of the piston 22 and into the mixing chamber 24. Flow of hot fluid through the piston 22 is throttled when the first end 22b of the piston 22 approaches the member 44. Flow of hot fluid through the piston will be prevented when the first end 22b comes into sliding contact with the member 44. This contact defines the "hot seat".

The second end 22c of the piston 22 is configured to engage against a seat 46 formed in the sidewall of the valve body 12 of the thermostatic valve 10. For ease of further description, the seat 46 will be referred to hereafter as the "cold seat" 46. The second end 22c of the piston 22 and the cold seat 46 define a flow path through which cold fluid can pass from the cold inlet 14 into the mixing chamber 24. Flow of cold fluid into the mixing chamber 24 from the cold inlet 14 is throttled as the second end 22c of the piston 22 moves towards the seat 46. Cold fluid flow into the mixing chamber 24 will be prevented when the second end 22c of the piston 22 is located firmly against the cold seat 46 formed in the valve body 12. The spring 34 is biased to push the second end 22b of the piston onto the cold seat 46 and to balance the force of the thermostatic element 26.

In accordance with the embodiment shown in FIG. 1, the mixing tube 28 includes a socket or seat 50 which is arranged to receive a trailing end 26b of the thermostatic element 26. Thus, as depicted in FIG. 1, the thermostatic element 26 is located between and in contact with both the mixing tube 28 and the piston 22.

In the arrangement shown in FIG. 1, the adjustment mechanism takes the form of a screw thread 52 formed on the outer periphery of the mixing tube 28. The screw thread 52 is arranged to engage with a corresponding thread formed on the internal wall of the valve body 12. Accordingly, when the mixing tube 28 is rotated along the thread, the positioning of the mixing tube 28 and the connected thermostatic element 26 is adjusted in a direction towards or away from the hot inlet 16. When the positioning of the thermostatic element 26 is adjusted there is an adjustment in the positioning of the piston 22. For example, if the mixing tube 28 and the connected thermostatic element 26 are adjusted so as to move them towards the hot inlet 16, the piston 22 will also be moved towards the hot inlet 16. Thus, the second end 22c of the piston 22 will be moved away from the cold seat 46, allowing an increase in the flow of cold fluid from the cold fluid inlet 14 into the mixing chamber 24. At the same time there will be a decrease in the flow of fluid through the path defined between the first end 22b of the piston 22 and the member 44 and thus there will be a decrease in the flow of hot fluid into the mixing chamber 24. This will result in a reduction in the set temperature of the mixed fluid exiting the fluid outlet 18.

From the above description it will be appreciated that during manufacture or installation of the thermostatic mixing valve 10 it is possible to adjust the positioning of the mixing tube 28, thereby adjusting the rest position of the connected thermostatic element 26. This will result in an adjustment to the set temperature of the mixed fluid exiting the fluid outlet 18 during use thereof.

During use of the thermostatic mixing valve 10, cold fluid will enter the cold inlet 14 and hot fluid will enter the hot inlet 16. Unless the piston 22 is positioned to close off one of the hot or cold fluid paths, both hot and cold fluid will enter the mixing chamber 24 to surround the thermostatic element 26 and then exit through the outlet 18. Depending on the temperature of the mixed fluid within the mixing chamber 24, the thermostatic element 26 will either remain as it is, expand or contract. If the temperature of the fluid contacting the thermostatic element 26 is at the desired set temperature, the thermostatic element 26 will remain as it is and there will be no adjustment in the flow of hot and cold fluids into the mixing chamber 24. If the temperature of that fluid is too hot, the thermostatic element will expand so as to cause the piston 22 to move in a direction towards the hot inlet 16 against the bias of the spring 34. This will result in the second end 22c of the piston 22 moving away from the cold seat 46 and thus the flow of cold fluid into the mixing chamber 24 will increase. At the same time there will be a reduction in the flow of hot fluid through the fluid path defined by the first end 22b of the piston 22 and the member 44. Accordingly, this will result in the temperature of the mixed fluid within the mixing chamber 24 being reduced.

If the thermostatic element 26 continues to expand despite the increase of cold fluid into the mixing chamber 24, the piston 22 can continue to move within the bore of the valve body 12 by virtue of a sliding engagement of an inner peripheral wall 22d of the piston 22 with a peripheral portion 44a of the member 44. The peripheral portion 44a of the valve member 44 is an elongate portion that extends in the direction of the movement of the piston 22. It will thus be appreciated by those skilled in the art that this arrangement of the piston 22 and elongate portion of the member 44 provides a "slide through" hot seat configuration. By virtue of this "slide through" hot seat configuration, continued expansion of the thermostatic element 26 can be accommodated to a limited degree without damage to the valve 10.

If the temperature of the fluid contacting the thermostatic element 26 is too cold, the thermostatic element 26 will contract and there will be an increase in the flow of hot fluid and a decrease in the flow of cold fluid into the mixing chamber 24.

It will be appreciated that the thermostatic element 26 will continuously react (i.e. expand or contract) to the temperature of the fluid in the mixing chamber 24. As a consequence of this reaction, the piston 22 will continue to move within the bore of the valve body 12 so as to regulate the flow of cold and hot fluids into the mixing chamber 24. In this manner, the thermostatic mixing valve 10 will act to control the temperature of the fluid exiting the fluid outlet 18 to the set temperature. Provided the temperature of the cold and hot fluids entering the respective cold and hot inlets 14, 16 is reasonably constant, the positioning of the piston 22 relative to the cold and hot seats will eventually be stabilized.

FIGS. 2 and 3 illustrate a second embodiment of the invention. In this embodiment, the thermostatic mixing valve 100 has a similar form to that illustrated in the first embodiment, with the exception that there is no mixing tube 28 and accordingly the adjustment mechanism adopts a different form. In this second embodiment, the adjustment mechanism takes the form of an adjustment pin 128.

The adjustment pin 128 is located within the valve body 12 of the thermostatic mixing valve 100 so that it extends substantially perpendicularly to the longitudinal axis of the thermostatic element 26. The adjustment pin 128 has an inner portion 128a which is arranged to contact with the trailing end 26b of the thermostatic element 26. The adjustment pin 128 also has an outer end 128b which is accessible from the outside of the valve body 12 of the thermostatic mixing valve 100. The pin 128 is configured and arranged within the valve body 12 so that rotation of the adjustment pin 128 results in movement of the thermostatic element 26 either towards or away from the hot fluid inlet 16. This movement of the thermostatic element 26 results in a related movement of the piston 22 within the valve body 12 in a similar manner to that described previously above in relation to first embodiment of the invention.

As shown in FIGS. 2 and 3, the outer end 128b of the adjustment pin 128 is arranged to receive an allen key, screwdriver, tool or the like which enables ready rotation of the adjustment pin 128. Alternatively, the adjustment pin 128 may be slideable in a direction perpendicular to the longitudinal axis of the thermostatic element 26 and configured so that movement of the adjustment pin 128 will cause movement of the thermostatic element 26 in a direction towards or away from the hot inlet 16. In this manner the rest position of the thermostatic element 26 can be varied and thus the set temperature of the outlet fluid varied.

The mixing valve 100 shown in FIGS. 2 and 3 is particularly advantageous because the adjustment mechanism 128 of the valve 100 can be easily adjusted once the mixing valve 100 is installed. Adjustment can be achieved simply and quickly.

FIG. 4 illustrates a "T" pattern thermostatic mixing valve 200. The mixing valve 200 includes a valve body 212, a cold fluid inlet 214, a hot fluid inlet 216 and a mixed fluid outlet 218. The valve 200 also includes a piston 222, a mixing tube 224, a thermostatic element 226, a spring 234 and an adjustment mechanism 250.

The thermostatic element 226 is mounted in the mixing tube 224 and has a first end 226a in contact with the adjustment mechanism 250. The spring 234 is arranged to bias the mixing tube 224 towards the adjustment mechanism 250.

The piston 222 is mounted to the thermostatic element 226 so that movement of the thermostatic element 226 causes movement of the piston 222 within the bore of the valve body 212.

Fluid flow through the cold inlet 214 into the valve body 212 is throttled as the second end 222c of the piston 222 approaches a seat 246 (cold seat) formed in the valve body 212. Cold fluid flow into the mixing tube 224 will be prevented when the second end 222c of the piston 222 presses firmly against the seat 246 formed in the valve body 212 (the cold seat).

Fluid flow through the hot inlet 216 into the valve body 212 is throttled as a first end 222b of the piston 222 slides towards an elongate portion 212a (the hot seat) of the valve body 212. Hot fluid flow will be prevented when the second end 222b of the piston 222 comes into sliding contact with the portion 212a thereby blocking off the fluid flow path into the mixing tube 224. Limited continued expansion of the thermostatic element 226 is accommodated by continued sliding movement of the piston 222 along the portion 212a of the valve body 212 ("slide through" hot seat). Elongate portion 212a of the valve body 212 extends in the direction of movement of the piston 222.

The adjustment mechanism 250 is a threaded member which can be rotated so as to push the thermostatic element 226 against the bias of the spring 234. This results in a change in the rest position of the thermostatic element 226 and consequently a change in the positioning of the piston 222 relative to the cold and hot seats. Accordingly, the set temperature of the mixed fluid passing through the fluid outlet 218 is varied.

The described embodiments of the invention are considered to be particularly advantageous because they enable the set temperature of the outlet fluid of the thermostatic mixing valve to be readily varied, whilst minimizing any additional components or manufacture costs. It will also be appreciated that in the event that the thermostatic element continues to expand, the "slide through" hot seat arrangement of the various embodiments will absorb any over travel of the thermostatic element.

The embodiments have been described by way of example only and modifications within the spirit and scope of the invention are envisaged.

The discussion of the background to the invention herein is included to explain the context of the invention. This is not to be taken as an admission that any of the material referred to was published, known or part of the common general knowledge in Australia as at the priority date of any of the claims.

What is claimed:

1. A thermostatic mixing valve comprising:
    a valve body having a first fluid inlet for receiving a first fluid, a second fluid inlet for receiving a second fluid and a fluid outlet;
    a mixing chamber located between the respective fluid inlets and the fluid outlet;
    a thermostatic element located in or adjacent to the mixing chamber;
    a piston arranged for movement within the valve body in response to the thermostatic element, said piston arranged to throttle the flow of the first fluid into the mixing chamber by varying its position relative to a first fluid seat, said piston also arranged to throttle the flow of the second fluid into the mixing chamber by varying its position relative to a second fluid seat, wherein the second fluid seat is configured to allow for further movement of the piston as a result of continued expansion of the thermostatic element after flow of the second fluid into the mixing chamber is prevented.

2. A thermostatic mixing valve according to claim 1 wherein the second fluid seat is formed as an elongate portion extending in the direction of the movement of the piston so as to allow the piston to slide along the elongate portion to thereby allow for continued expansion of the thermostatic element.

3. A thermostatic mixing valve according to claim 2 wherein the elongate portion is formed on the valve body.

4. A thermostatic mixing valve according to claim 3 wherein an outer peripheral wall of the piston slides along the elongate portion.

5. A thermostatic mixing valve according to claim 2 wherein the elongate portion is formed on a member located within the valve body.

6. A thermostatic mixing valve according to claim 5 wherein an inner peripheral wall of a bore of the piston slides along the elongate portion.

7. A thermostatic mixing valve according to claim 1 wherein the first fluid seat is a seat formed in a portion of the valve body.

8. A thermostatic mixing valve according to claim 1 further including an adjustment mechanism for adjusting a rest position of the thermostatic element.

9. A thermostatic mixing valve according to claim 8 wherein the adjustment mechanism is arranged to adjust the positioning of the thermostatic element relative to the piston so that a set temperature of the fluid through the fluid outlet can be varied.

10. A thermostatic mixing valve according to claim 4 wherein the piston includes a socket for engaging with the thermostatic element.

11. A thermostatic mixing valve according to claim 1 further including a mixing tube arranged to direct the flow of first and second fluids onto the thermostatic element.

12. A thermostatic mixing valve according to claim 11 wherein the mixing tube is configured to seat a trailing end of the thermostatic element.

13. A thermostatic mixing valve according to claim 12 wherein a leading end of the thermostatic element is arranged to contact a portion of the piston.

14. A thermostatic mixing valve according to claim 8 wherein the adjustment mechanism includes a thread arrangement formed on the periphery of a mixing tube which is arranged to engage with a thread formed in the sidewall of the mixing chamber so that the mixing tube's positioning within the mixing chamber can be adjusted relative to the piston by rotating the mixing tube, wherein the mixing tube is arranged to direct the flow of first and second fluids onto the thermostatic element.

15. A thermostatic mixing valve according to claim 8, wherein the adjustment mechanism includes means for varying the size of a mixing tube arranged to direct flow of first and second fluids onto the thermostatic element so that it can be located in one of a series of seats formed in the sidewall of the mixing chamber thereby adjusting the positioning of the mixing tube relative to the piston.

16. A thermostatic mixing valve according to claim 8 wherein the adjustment mechanism includes an adjustment pin configured so that an inner portion of the pin is in contact with a trailing end of the thermostatic element.

17. A thermostatic mixing valve according to claim 16 wherein the adjustment pin includes an outer end which is accessible from the outside of the valve body thereby enabling movement of the pin which results in an adjustment in the positioning of the thermostatic element relative to the piston.

18. A thermostatic mixing valve according to claim 16 wherein the adjustment pin is threadedly connected to the valve body of the thermostatic mixing valve.

19. A thermostatic mixing valve according to claim 1 further including a check valve mounted adjacent each of the first and second fluid inlets to prevent back flow of fluid through the respective inlets.

20. A thermostatic mixing valve according to claim 1 wherein the first fluid inlet is a cold fluid inlet and the second fluid inlet is a hot fluid inlet.

21. A method of adjusting the temperature of an outlet fluid through a thermostatic valve, said thermostatic valve comprising a valve body having a first fluid inlet, a second fluid inlet and a fluid outlet; a mixing chamber located between the respective fluid inlets and the fluid outlet; a piston arranged to regulate the flow of the first and second fluids from their respective inlets into the mixing chamber; a thermostatic element located in or adjacent to the mixing chamber; and an adjustment mechanism for adjusting a rest position of the thermostatic element relative to the piston wherein the adjustment mechanism includes a thread arrangement formed on the periphery of a mixing tube which is arranged to engage with a thread formed in the sidewall of the mixing chamber so that the mixing tube's positioning within the mixing chamber can be adjusted relative to the piston by rotating the mixing tube, wherein the mixing tube is arranged to direct the flow of first and second fluids onto the thermostatic element, said method comprising:

adjusting the adjustment mechanism to modify the rest position of the thermostatic element relative to the piston to thereby change the flow of the first and second fluids into the mixing chamber until the temperature of the outlet fluid through the fluid outlet is at a desired set temperature.

22. A thermostatic mixing valve comprising:
a valve body having a first fluid inlet, a second fluid inlet and a fluid outlet;
a mixing chamber located between the respective fluid inlets and the fluid outlet;
a piston arranged to regulate the flow of the first and second fluids from their respective inlets into the mixing chamber;
a thermostatic element located in or adjacent to the mixing chamber; and
an adjustment mechanism for adjusting a rest position of the thermostatic element wherein the adjustment mechanism includes a thread arrangement formed on the periphery of a mixing tube which is arranged to engage with a thread formed in the sidewall of the mixing chamber so that the maxing tube's positioning within the mixing chamber can be adjusted relative to the piston by rotating the mixing tube, wherein the mixing tube is arranged to direct the flow of first and second fluids onto the thermostatic element.

23. A thermostatic mixing valve according to claim 17 wherein the adjustment pin is threadedly connected to the valve body of the thermostatic mixing valve.

24. A method of adjusting the temperature of an outlet fluid through a thermostatic valve, said thermostatic valve comprising a valve body having a first fluid inlet, a second fluid inlet and a fluid outlet; a mixing chamber located between the respective fluid inlets and the fluid outlet; a piston arranged to regulate the flow of the first and second fluids from their respective inlets into the mixing chamber; a thermostatic element located in or adjacent to the mixing chamber; and an adjustment mechanism for adjusting a rest position of the thermostatic element relative to the piston wherein the adjustment mechanism includes means for varying the size of a mixing tube arranged to direct flow of first and second fluids onto the thermostatic element so that it can be located in one of a series of seats formed in the sidewall of the mixing chamber thereby adjusting the positioning of the mixing tube relative to the piston, said method comprising:

adjusting the adjustment mechanism to modify the rest position of the thermostatic element relative to the piston to thereby change the flow of the first and second fluids into the mixing chamber until the temperature of the outlet fluid through the fluid outlet is at a desired set temperature.

25. A thermostatic mixing valve comprising:
a valve body having a first fluid inlet, a second fluid inlet and a fluid outlet;
a mixing chamber located between the respective fluid inlets and the fluid outlet;
a piston arranged to regulate the flow of the first and second fluids from their respective inlets into the mixing chamber;
a thermostatic element located in or adjacent to the mixing chamber; and
an adjustment mechanism for adjusting a rest position of the thermostatic element wherein the adjustment mechanism includes means for varying the size of a mixing tube arranged to direct flow of first and second fluids onto the thermostatic element so that it can be located in one of a series of seats formed in the sidewall of the mixing chamber thereby adjusting the positioning of the mixing tube relative to the piston.

26. A thermostatic mixing valve comprising;
a valve body having a cold fluid inlet, a hot fluid inlet and a mixed fluid outlet;
a mixing chamber located between the respective fluid inlets and the mixed fluid outlet;
a thermostatic element located in or adjacent to the mixing chamber;
a piston arranged for movement within the valve body in response to the thermostatic element, said piston arranged to throttle the flow of the cold fluid into the mixing chamber by varying its position relative to a cold fluid seat, said piston also arranged to throttle the flow of the hot fluid into the mixing chamber by varying its position relative to a hot fluid seat; and
said hot fluid seat comprising an elongate portion on either the valve body or another member, said elongate portion extending in a direction substantially parallel to the direction of movement of the piston so as to allow a part of the piston to slide along the elongate portion after the flow of the hot fluid into the mixing chamber is throttled to prevent hot fluid flow to the mixing chamber thereby allowing for a limited continued expansion of the thermostatic element.

* * * * *

UNITED STATES PATENT AND TRADEMARK OFFICE
CERTIFICATE OF CORRECTION

PATENT NO. : 7,665,671 B2
APPLICATION NO. : 10/559975
DATED : February 23, 2010
INVENTOR(S) : Aaron Christian Cunningham and Tony Mark Scott It is certified that error appears in the above-identified patent and that said Letters Patent is hereby corrected as shown below:

In Claim 22, Column 9, Line 35 of the patent, "so that the maxing tube's positioning within the" should read --so that the mixing tube's positioning within the--.

Signed and Sealed this

Twenty-fifth Day of May, 2010

David J. Kappos
*Director of the United States Patent and Trademark Office*